（12） United States Patent
Schmitz

(10) Patent No.: US 11,654,840 B2
(45) Date of Patent: May 23, 2023

(54) PANELING ELEMENT FOR A VEHICLE INTERIOR COMPARTMENT AND METHOD FOR PRODUCING A PANELING ELEMENT CROSS REFERENCE TO RELATED APPLICATION

(71) Applicant: Dr. Ing. h.c. F. Porsche Aktiengesellschaft, Stuttgart (DE)

(72) Inventor: Stefan Schmitz, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 238 days.

(21) Appl. No.: 17/082,493

(22) Filed: Oct. 28, 2020

(65) Prior Publication Data

US 2021/0122304 A1    Apr. 29, 2021

(30) Foreign Application Priority Data

Oct. 28, 2019    (DE) ...................... 10 2019 129 020.1

(51) Int. Cl.
| | |
|---|---|
| *B60R 13/08* | (2006.01) |
| *B60R 13/02* | (2006.01) |
| *B32B 5/18* | (2006.01) |
| *G10K 11/162* | (2006.01) |
| *B32B 5/02* | (2006.01) |

(52) U.S. Cl.
CPC .......... *B60R 13/0815* (2013.01); *B32B 5/022* (2013.01); *B32B 5/18* (2013.01); *B60R 13/0206* (2013.01); *G10K 11/162* (2013.01); *B32B 2307/10* (2013.01); *B32B 2605/003* (2013.01)

(58) Field of Classification Search
None
See application file for complete search history.

(56) References Cited

U.S. PATENT DOCUMENTS 6,089,349 A    7/2000    Aye

FOREIGN PATENT DOCUMENTS

| DE | 10 2005 048 069 | 4/2007 | |
| DE | 102005048069 A1 * | 4/2007 | ........... B60R 13/083 |
| DE | 10 2006 047 771 | 12/2007 | |
| DE | 10 2008 025 840 | 12/2009 | |

OTHER PUBLICATIONS

Schmidt et al., Insulating Mat, Apr. 12, 2007, machine translation of DE 102005048069 (Year: 2007).*
German Search Report dated Jun. 22, 2020.

* cited by examiner

*Primary Examiner* — Chinessa T. Golden
(74) *Attorney, Agent, or Firm* — Gerald E. Hespos; Michael J. Porco

(57) ABSTRACT

A paneling element for a vehicle interior compartment has a carrier element (12) and a sound-reducing element (14) arranged on a surface (42) of the carrier element (12). The surface (42) of the carrier element (12) has at least one access region (19) that faces the sound-reducing element (14). The sound-reducing element (14) has an access opening (18) through which the access region (19) can be accessed. The sound-reducing element (14) has a cantilevered tongue (24) that can close the access opening (18) in the unmounted state of the sound-reducing element (14). The cantilevered tongue (24) is folded over in the mounted state of the sound-reducing element (14) so that the access opening (18) is opened.

19 Claims, 2 Drawing Sheets

PANELING ELEMENT FOR A VEHICLE INTERIOR COMPARTMENT AND METHOD FOR PRODUCING A PANELING ELEMENT CROSS REFERENCE TO RELATED APPLICATION

CROSS REFERENCE TO RELATED APPLICATION

This application claims priority under 35 USC 119 to German Patent Appl. No. 10 2019 129 020.1 filed on Oct. 28, 2019, the entire disclosure of which is incorporated herein by reference.

BACKGROUND

Field of the Invention

The invention relates to a paneling element for a vehicle interior compartment, having a carrier element and a sound-reducing element arranged on a wide surface of the carrier element. The carrier element has at least one access region arranged on the wide surface that faces the sound-reducing element, and the sound-reducing element has an access opening through which the access region can be accessed.

RELATED ART

Interior compartments of motor vehicles usually have panels arranged, for example, on the dashboard, on the vehicle doors or on the vehicle roof to cover the bodyshell of the motor vehicle. The panel may be used for sound insulation and/or sound damping of the motor vehicle interior compartment and reduce external noise and engine noise, particularly at high speeds. Thus, panels help to achieve noise levels in the motor vehicle interior compartment that will be pleasant for the driver and the passengers.

Known panels comprise a carrier element that has a wide surface visible to the driver and passenger in the motor vehicle interior compartment. The wide surface may be coated or veneered for a better visual appearance and haptics. The wide surface that faces away from the motor vehicle interior compartment has a sound-reducing element that is fastened to the carrier element by welding, adhesive bonding, riveting or another known form-fitting or materially bonded manner. The sound-reducing element usually is a flexible mat, for example a foam, nonwoven, felt or textile mat. A sound-damping panel of this type is disclosed in DE 10 2008 025 840 A1.

The surface of the known carrier element that faces the sound-reducing element also usually has at least one access region with fastening means or other elements that can be accessed by a worker. The sound-reducing element typically has an access opening through which the access region of the carrier element can be accessed by the worker.

An access opening of this type on the sound-reducing element usually is produced by positioning the sound-reducing element between two tool halves that have been moved apart from one another. A blade is arranged on one of the two tool halves, and cuts into the insulating element by moving the tool halves together. This result, for example, in a circular access opening having an encircling cut edge. The cut-out waste material then is removed from the mold manually by a worker.

A disadvantage of a panel of this type is that the production of the sound-reducing element and thus of the paneling element is time-consuming and cost-intensive. Furthermore, there is a high risk of injury for the worker who removes the waste manually from the mold.

An object of the invention is to provide a panel that can be produced easily, cost-effectively and in a manner safe for a worker.

SUMMARY

The invention relates to a sound-reducing element with a cantilevered tongue that can close the access opening in the unmounted state of the sound-reducing element. The cantilevered tongue in the mounted state of the sound-reducing element is folded over in such a way that the access opening is opened up. Thus, a panel can be produced easily and cost-effectively.

In contrast with cutting out an access opening with an encircling cut edge, the access opening disclosed herein is created by a cantilevered tongue that is produced by a linear, non-closed incision on the sound-reducing element, and the cantilevered tongue then is bent over. The bending over of the cantilevered tongue opens up the access opening so that the access region can be accessed. In this way, no waste is produced and no waste has to be removed manually by a worker. In addition, the production process can be automated easily and cost-effectively.

The free end of the folded-over cantilevered tongue may be fixed to the sound-reducing element with its free end. Thus, the access region is permanently accessible and visible.

In one embodiment, the sound-reducing element has a fastening opening into which the folded-over cantilevered tongue can be pushed. The fastening opening may be a linear incision. Thus, the cantilevered tongue can be fixed easily and reliably.

The tongue may be flexible and the cantilevered end of the tongue in the width direction may be wider than the fastening opening. The tongue is pushed into the fastening opening in a deformed state of the cantilevered end, and the cantilevered end then expands again. As a result, the cantilevered tongue can be fixed reliably in the folded-over state. In one embodiment, the cantilevered tongue and the access opening have an arrow-shape, a mushroom-shape or a T-shape.

The carrier element may have a fastening means for fastening the panel. The fastening means may be arranged in the access region. In one embodiment, the fastening means may be a fastening projection that extends through the access opening. The fastening means makes it possible for the panel to be fastened to a motor vehicle body easily and without separate fastening elements.

A component identifier may be provided at the access region, such as at a hole or on at least one element that is fastened to the carrier element. The component identifier enables easy identification of the panel.

The sound-reducing element may be a flexible foam, nonwoven, felt or textile mat to achieve good acoustic sound damping and/or sound insulation.

The invention is also achieved by a method for producing a panel. The method comprises providing the carrier element and the sound-reducing element are provided. The method then includes cutting the sound-reducing element to produce the cantilevered tongue. The method further includes folding the cantilevered tongue over and fastening the sound-reducing element to the carrier element with the sound-reducing element oriented such that the access opening and the access region overlap.

One embodiment of the invention is explained with reference to the figures.

DETAILED DESCRIPTION

Figure 1:
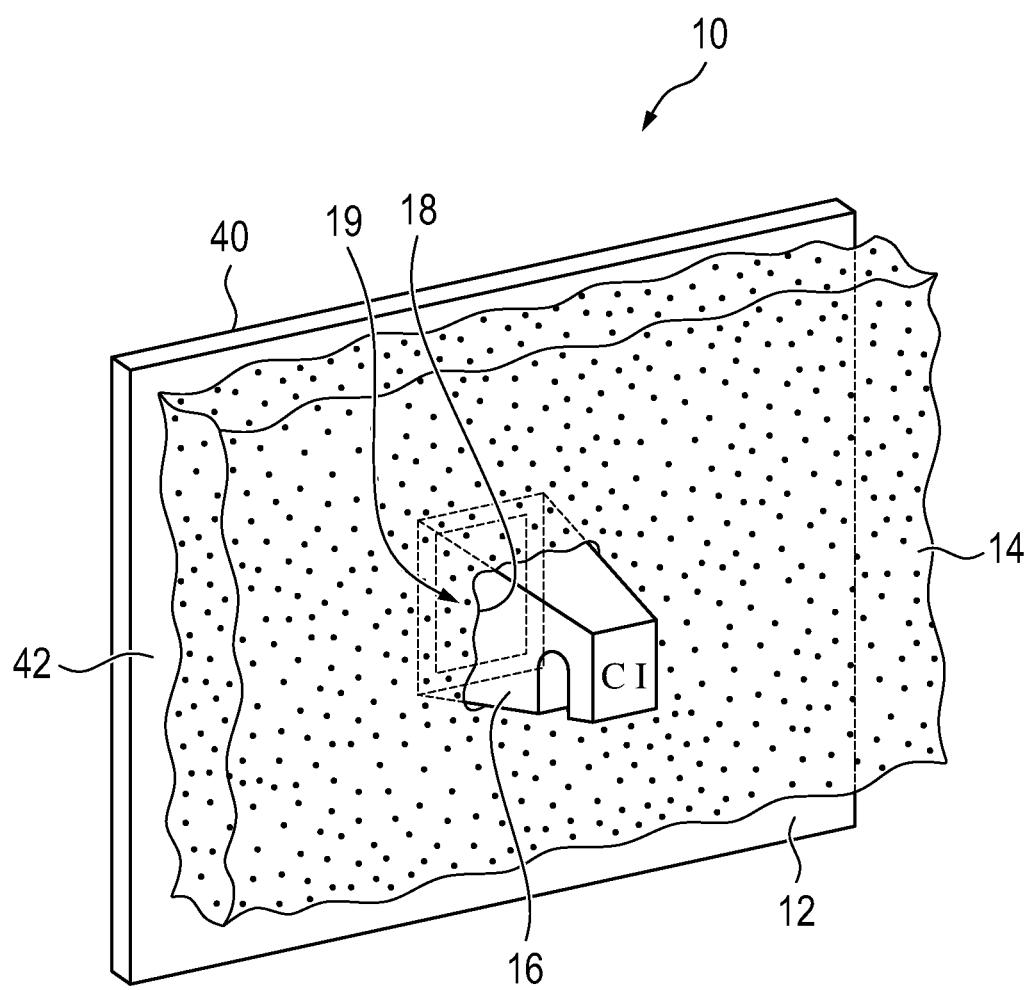
FIG. 1 schematically shows a panel for a motor vehicle interior compartment.

FIG. 1 shows a paneling element 10 for a vehicle interior compartment. Paneling elements 10 of this type are arranged, for example, on the dashboard, on the vehicle doors or on the vehicle roof and covering the bodyshell of the motor vehicle. The paneling element 10 comprises a carrier element 12 and a sound-reducing element 14.

The carrier element 12 has a wide surface 40 that faces the vehicle interior compartment and is covered for example by a veneer (not shown). The carrier element 12 also has a wide surface 42 that faces away from the vehicle interior compartment and on which the sound-reducing element 14 is arranged. The sound-reducing element 14 is a flexible mat and is bonded adhesively to the wide surface 42 of the carrier element 12 that faces the sound-reducing element 14.

The carrier element 12 has an access region 19 arranged on the wide surface 42 that faces the sound-reducing element 14. The sound-reducing element 14 has an access opening 18 that overlaps with the access region 19 so that the access region 19 can be accessed through the access opening 18. A fastening element 16 is arranged in the access region 19 and defines a fastening projection that extends through the access opening 18. As an alternative, a component identifier or another element that can be accessed in the mounted state of the sound-reducing element 14 also could be arranged in the access region 19.

The access opening 18 is produced by cutting the sound-reducing element 14 to produce a cantilevered tongue 24 that closes the access opening 18 in the unmounted state of the sound-reducing element 14. However, the cantilevered tongue 24 is bent over in the mounted state of the sound-reducing element 14 to open up the access opening 18.

Figure 2A:
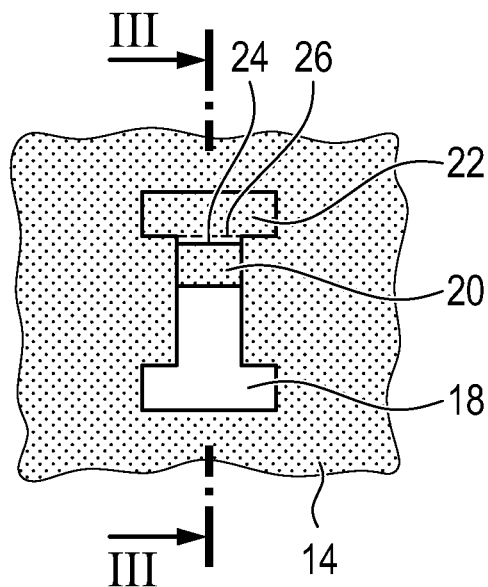
FIGS. 2a-2c show optional details of a sound-reducing element of the panel from FIG. 1.
Figure 2B:
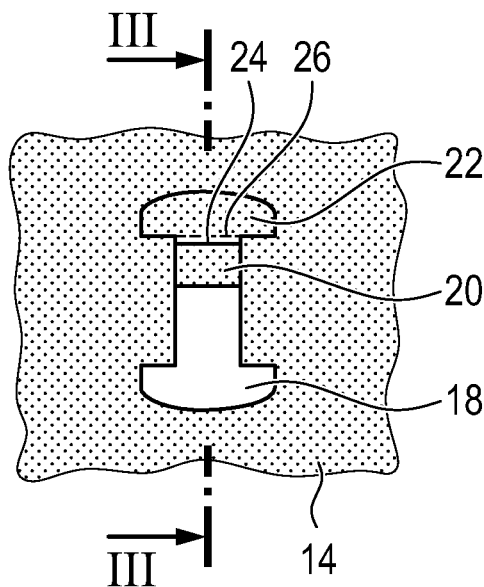
Figure 2C:
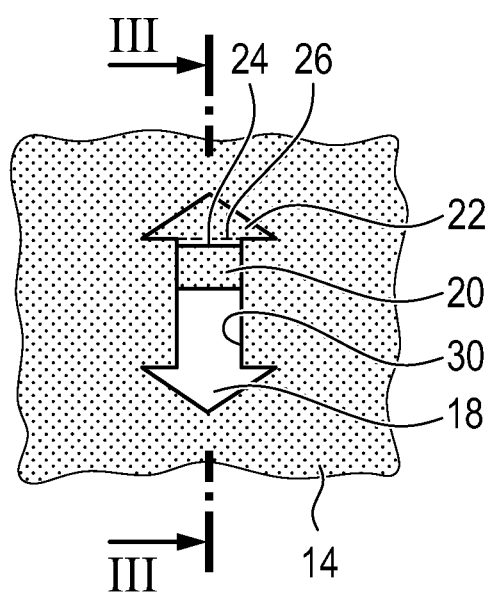
Figure 3:
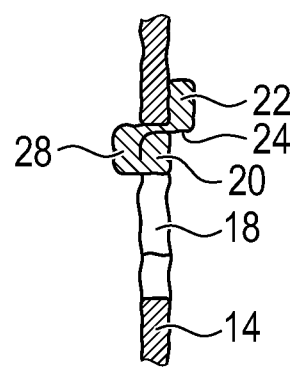
FIG. 3 is a cross-section of the sound-reducing element from any of FIGS. 2a-2c.

The cantilevered tongue 24 and the access opening 18 that is opened up in the bent-over state of the cantilevered tongue 24 have a T-shaped, mushroom-shaped or arrow-shaped form, as shown in FIGS. 2a, 2b, 2c. The cantilevered tongue 24 has an elongate portion 28 and an adjacent wide portion 22 to define the T-shaped, mushroom-shaped or arrow-shaped form.

A component identifier CI is provided at the access region 19, such as at a hole or on at least one element, such as the fastening element 16, that is fastened to the carrier element 12. The component identifier CI enables easy identification of the paneling element 10.

Cutting into the sound-reducing element 14 with a straight incision produces a fastening opening 26. The fastening opening 26 is spaced apart from the access opening 18 such that a web 20 is provided between the access opening 18 and the fastening opening 26.

The cantilevered tongue 24 is bent over after the sound-reducing element 14 has been cut into and then is pushed into the fastening opening 26. As a result, the cantilevered tongue 24 is fixed in the bent-over position. The wide portion 22 of the cantilevered tongue 24 has a width that is wider than the fastening opening 26. Thus, the free end 22 of the cantilevered tongue 24 is compressed and is pushed through the fastening opening 26 in the compressed state. The wide portion 22 expands upon moving through the fastening opening 26 so that the cantilevered tongue 24 is fixed in the manner of a hook. Therefore, the cantilevered tongue 24 is fixed reliably in the bent-over state and the access opening 18 is opened up permanently.

The above-described sound reducing-element 14 enables a paneling element 10 to be produced easily and cost-effectively. Additionally, the production of the sound-reducing element 14 in the manner described above yields no waste that has to be removed from the mold and disposed of.

Other design embodiments than the embodiments described that fall within the scope of protection of the main claim are also possible.

What is claimed is:

1. A paneling element for a vehicle interior compartment, comprising:
    a carrier element having a surface and at least one access region arranged on the surface of the carrier element; and
    a sound-reducing element arranged on the surface of the carrier element and having an access opening through which the access region of the carrier element can be accessed, a cantilevered tongue formed integrally with the sound-reducing element and configured to close the access opening in an unmounted state of the sound-reducing element on the carrier element, the cantilevered tongue being folded over and in a position that opens up the access opening when the sound-reducing element is arranged on the surface of the carrier element wherein the cantilevered tongue closes the access opening of the sound-reducing element when the sound reducing element is not mounted on the carrier element, and the cantilevered tongue has a free end that is fixed to a location on the sound-reducing element that is spaced from the access opening when the sound-reducing element is mounted on the carrier element.

2. The paneling element of claim 1, wherein the cantilevered tongue is defined at least partly by a linear and non-closed incision on the sound-reducing element.

3. The paneling element of claim 1, wherein the sound-reducing element has a fastening opening and the free end of the cantilevered tongue that has been folded over is pushed into the fastening opening.

4. The paneling element of claim 3, wherein the fastening opening is a linear incision.

5. The paneling element of claim 3, wherein the cantilevered tongue is flexible and the free end of the cantilevered tongue has a width transverse to an extending cantilevered direction of the cantilevered tongue that is wider than the fastening opening.

6. The paneling element of claim 5, wherein the cantilevered tongue and the access opening have an arrow-shaped, mushroom-shaped or T-shaped form.

7. The paneling element of claim 1, wherein the carrier element has a fastening means for fastening the paneling element, the fastening means being arranged in the access region.

8. The paneling element of claim 7, wherein the fastening means is a fastening projection that extends through the access opening.

9. The paneling element of claim 1, further comprising a component identifier fastened to the carrier element in the access region.

10. The paneling element of claim 1, further comprising a component identifying hole in the access region.

11. The paneling element of claim 1, wherein the sound-reducing element is produced from a flexible foam, nonwoven, felt or textile mat.

12. A paneling element for a vehicle interior compartment, comprising:
  a carrier element having a surface and at least one fastening projection projecting on the surface of the carrier element; and
  a sound-reducing element having opposite first and second surfaces, the first surface of the sound-reducing element being arranged on the surface of the carrier element, the sound reducing element including a web with opposite first and second ends, a fastening slot extending through the sound-reducing element at the first end of the web, a flexible tongue cantilevered from the second end of the web, the tongue being bendable from a first position where opposite surfaces of the tongue are coextensive with the opposite first and second surfaces of the sound-reducing element and a second position where the tongue is bent so that a free end of the tongue is passed through and retained in the fastening slot, thereby leaving an access opening through which the fastening projection of the carrier element is passed for holding the sound-reducing element on the surface of the carrier element.

13. The paneling element of claim 12, wherein the sound-reducing element is produced from a foam material.

14. The paneling element of claim 12, wherein the sound-reducing element is produced from a nonwoven material.

15. The paneling element of claim 12, wherein the sound-reducing element is produced from a felt.

16. The paneling element of claim 12, wherein the sound-reducing element is produced from a textile mat.

17. The paneling element of claim 12, wherein the fastening slot is a linear incision.

18. The paneling element of claim 12, wherein the free end of the cantilevered tongue has a width transverse to an extending cantilevered direction of the cantilevered tongue that is wider than the fastening opening.

19. The paneling element of claim 12, wherein the cantilevered tongue and the access opening have an arrow-shaped, mushroom-shaped or T-shaped form.

* * * * *